United States Patent [19]

Aston

[11] Patent Number: 5,288,298
[45] Date of Patent: Feb. 22, 1994

[54] ANTIMICROBIAL AIR FILTER AND METHOD OF MAKING SAME

[76] Inventor: William T. Aston, 5003 Gardenia Cir., Marietta, Ga. 30068

[21] Appl. No.: 901,971

[22] Filed: Jun. 22, 1992

[51] Int. Cl.$^5$ .............. B01D 53/04; B01D 29/56
[52] U.S. Cl. ........................... 55/279; 55/485; 55/486; 55/524; 55/DIG. 13; 55/DIG. 42; 96/135; 96/154
[58] Field of Search ............... 55/279, 316, 387, 524, 55/DIG. 13, DIG. 42; 422/28, 4, 33

[56] References Cited

U.S. PATENT DOCUMENTS

| | | | |
|---|---|---|---|
| 2,881,854 | 4/1959 | Uehre | 55/316 |
| 3,017,239 | 1/1962 | Rodman | 55/279 X |
| 3,019,127 | 1/1962 | Czerwonka et al. | 55/316 |
| 3,217,470 | 11/1965 | Omohundro | 55/279 |
| 3,531,920 | 10/1970 | Hart | 55/521 |
| 3,577,710 | 5/1971 | Feldman | 55/279 X |
| 4,631,297 | 12/1986 | Battice et al. | 55/279 |
| 4,897,095 | 1/1990 | Bedi et al. | 55/279 |
| 4,917,862 | 4/1990 | Kraw et al. | 55/279 X |
| 4,935,232 | 6/1990 | McIntosh | 424/78 |
| 5,074,894 | 12/1991 | Nelson | 55/279 X |
| 5,108,474 | 4/1992 | Riedy et al. | 55/521 |
| 5,192,342 | 3/1993 | Baron et al. | 55/279 X |

FOREIGN PATENT DOCUMENTS 63-49217  3/1988  Japan .................. 55/279

OTHER PUBLICATIONS

Ventilation and Air Purification Equipment for Civil Defense Protective Shelters Sep. 24, 1965 p. 21 Flanders Fillers Riverhead, New York.

*Primary Examiner*—Robert Spitzer
*Attorney, Agent, or Firm*—Kennedy & Kennedy

[57] ABSTRACT

An antimicrobial air filter has a layer of fabric bearing porous activated carbon particulate deodorizing agents, a layer of polymeric expanded foam filter media impregnated with a biostat type antimicrobial agent and a pleated sheet of HEPA filtration media treated with the biostat. The layers are assembled such that the biostat does not migrate into the porous carbon particulates. The filter may be used in central air conditioning and heating systems without the need for an air circulator in addition to those conventionally employed.

18 Claims, 3 Drawing Sheets

ANTIMICROBIAL AIR FILTER AND METHOD OF MAKING SAME

TECHNICAL FIELD

This invention relates generally to air filters of the type used in central heating and air conditioning systems of office and residential buildings, and particularly to the filtration media employed in such filters.

BACKGROUND OF THE INVENTION

Air filters are routinely provided in central heating and air conditioning systems of office and residential buildings. These filters commonly employ non-woven, polyester fiber, air filtration media to filter dust type airborne particulates of sizes in excess of 10 microns from the air. Today the media often is treated with antimicrobial agents to rid air of fungi, bacteria, viruses, algae, yeasts and molds. This conventional air filtration media is not washable and thus has to be periodically replaced. Its effectiveness in ridding air of microorganisms has also been very limited since the fibrous media is so lacking in density as to permit a significant portion of submicron sized particles and air at the molecular level to pass through the media without direct contact with the treated fibers.

In some spatial environments it is necessary to filter submicron particulates from the air with far greater efficiency. Industrial clean rooms and hospital surgical rooms, for example, require that particulates as small as some 0.1 microns be filtered in a highly efficient manner. For this purpose high efficiency particulate arresting filters, commonly referred to as HEPA filters, are employed. HEPA air filtration media is usually in the form of pleated sheets of paper comprised of a random matrix of borosilicate micro fibers. The individual pleats may be separated by metallic separators or made separatorless by the media itself being formed with embossed areas or dimples. HEPA media is so dense however, particularly when the pleats have been tightly compacted, as to require the use of air blowers and fans more powerful than those employed in conventional central air conditioning and heating systems. HEPA filters have therefore been believed to be unsuitable for use in central air heating and air conditioning systems, particularly if treated with an antimicrobial agent, or combined with additional filters, without enhancement of their airflow driving means.

Another type of air filtration media, which is washable and reusable, is thermally reticulated polyester or polyurethane foam. This media is today used to filter airflow in internal combustion engines such as those used to propel automobile vehicles and lawn mowers. It is effective in filtering dust-like airborne particulate larger than 10 microns. However, it has been believed not to be useable in central heating and air conditioning systems.

Still another type of air filtration media is that of fibrous non-woven polyester and polyurethane sheets impregnated with activated carbon. This media is useful in deodorizing air as odor generating molecules entrained in airstreams attached to particulates filtered by the fibers migrate into the carbon pores where they become entrapped. Attempts to apply antimicrobial agents to this type of media have failed as the agents have been found to deactivate the carbon particles.

As previously stated, microorganisms such as fungi and bacteria are too small to be filtered by disposable, non-woven, polyester fiber media or by reusable, thermally reticulated polyester and polyurethane foam filter media. For example, the rod length of acetobacter melanogenus is between 1.0 and 2.0 microns; that of bacillus anthraces between 3.0 and 10.0 microns; that of haemophilus influenzae between 0.5 and 2.0 microns; that of shigella dysenteriae between 1.0 and 3.0 microns; and that of streptococcus lactis between 0.5 and 1.0 microns. Indeed, the average size of such bacteria is one-half micron. The air ducts of buildings in which people have been stricken with the illness now known as sick building syndrome have been treated with antimicrobial agents but with only very limited and quite temporal effectiveness. And, as previously stated, attempts to treat the filter media itself have failed to be effective without airflow enhancements.

It thus is seen that a need has long existed for an air filter capable of being used in conventional central heating and air conditioning systems of office or residential buildings that is effective in ridding the air of microorganisms without the need for stronger air circulation means. It is therefore to the provisions of such that the present invention is primarily directed.

SUMMARY OF THE INVENTION

An antimicrobial air filter has now been devised for use in conventional central heating and air conditioning systems without the need for blowers or fans stronger than those normally used therewith, such as a ⅛ HP in homes and 10 HP in office buildings, depending on the air flow rate required. The filter comprises a layer of fabric that bears porous activated carbon particulate deodorizing agents and a layer of polymeric expanded foam filter media impregnated with a biostat type antimicrobial agent. The fabric layer is separated from the foam layer such that the antimicrobial agent is substantially prevented from contacting the porous activated carbon particulate deodorizing agents and clogging their pores. This separation may be provided by means of another layer of the foam that is not treated with the antimicrobial agent, by a screen, or by an air gap. The filter may be used alone or as a prefilter for a HEPA filter system of the separatorless type having dimpled, pleated sheet that may also be treated with a biostat.

BRIEF DESCRIPTION OF THE DRAWING

FIG. 1A schematically shows the arrangement of two such filters mounted in an air duct. This figure shows the arrangement of example 4 of the detailed description. However, it also is provided for reference with regard to Examples 1-3 which have fewer than all of the filter layers shown in FIG. 1.

DETAILED DESCRIPTION

Figure 3:
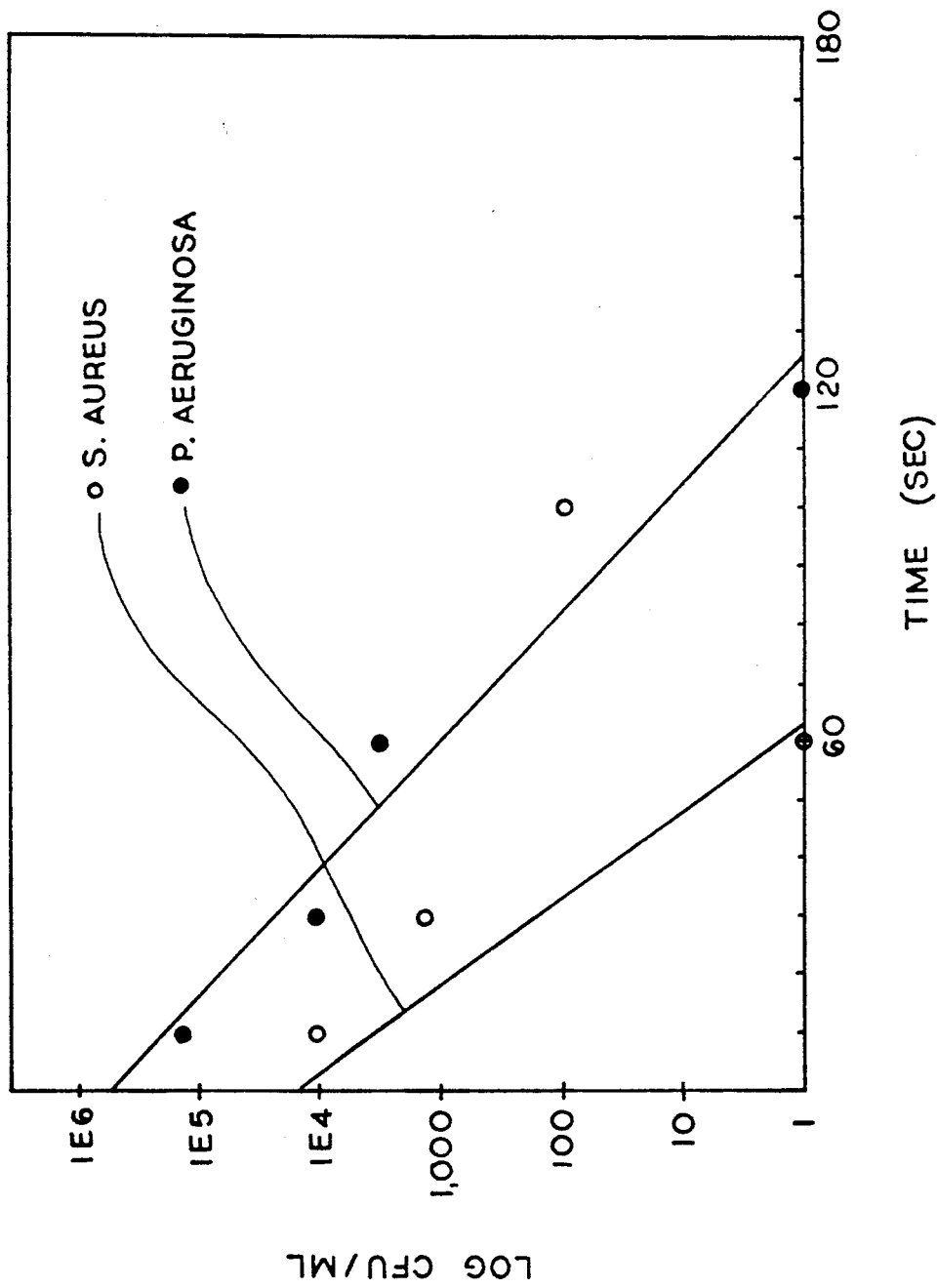
FIG. 3 is a bioefficacy graph for the preferred automicrobial agent with colony forming unit numbers plotted against time in seconds.

The preferred biostat employed as the antimicrobial agent is that sold by Interface Research Corporation of Kennesaw, Georgia under the trademark Intersept. Its composition is believed to be described in U.S. Pat. No. 4,935,232 issued on Jun. 19, 1990. Its bioefficacy on the filters of Examples 1-4 is shown in FIG. 3.

Testing of the filter media other than HEPA for particulate arresting efficiency and for pressure drop was done in accordance with the test protocol set forth in Standard 52-76 of the American Society of Heating, Refrigeration and Air Conditioning Engineers, also known as ASHRAE. Performance testing for the HEPA media was conducted in accordance with U.S. Military Standard 282 titled Filter Units, Protective Clothing, Gas Mask Components and Related Products: Performance Test Methods.

EXAMPLE 1

The upstream surface of a conventional layer 11 of thermally reticulated polyester foam filter media measuring 24 inches by 30 inches by ¼ inch thick, sold by Foamex of Eddystone, Pa., with 20 pores per inch, was sprayed with a 10% Intersept, 90% water solution. The spray was done at a rate to deliver, after evaporation of the water, approximately 2¼% active Intersept per square foot of filter surface area. This equates to 0.16 grams/square foot. Less than 2% strength was found not to provide sufficient bioefficacy while 2¼% or more was found not to provide greater reduction in the number of colony forming units of bacteria per square foot of filter surface area than the 2¼% residual Intersept achieved.

Figure 1:
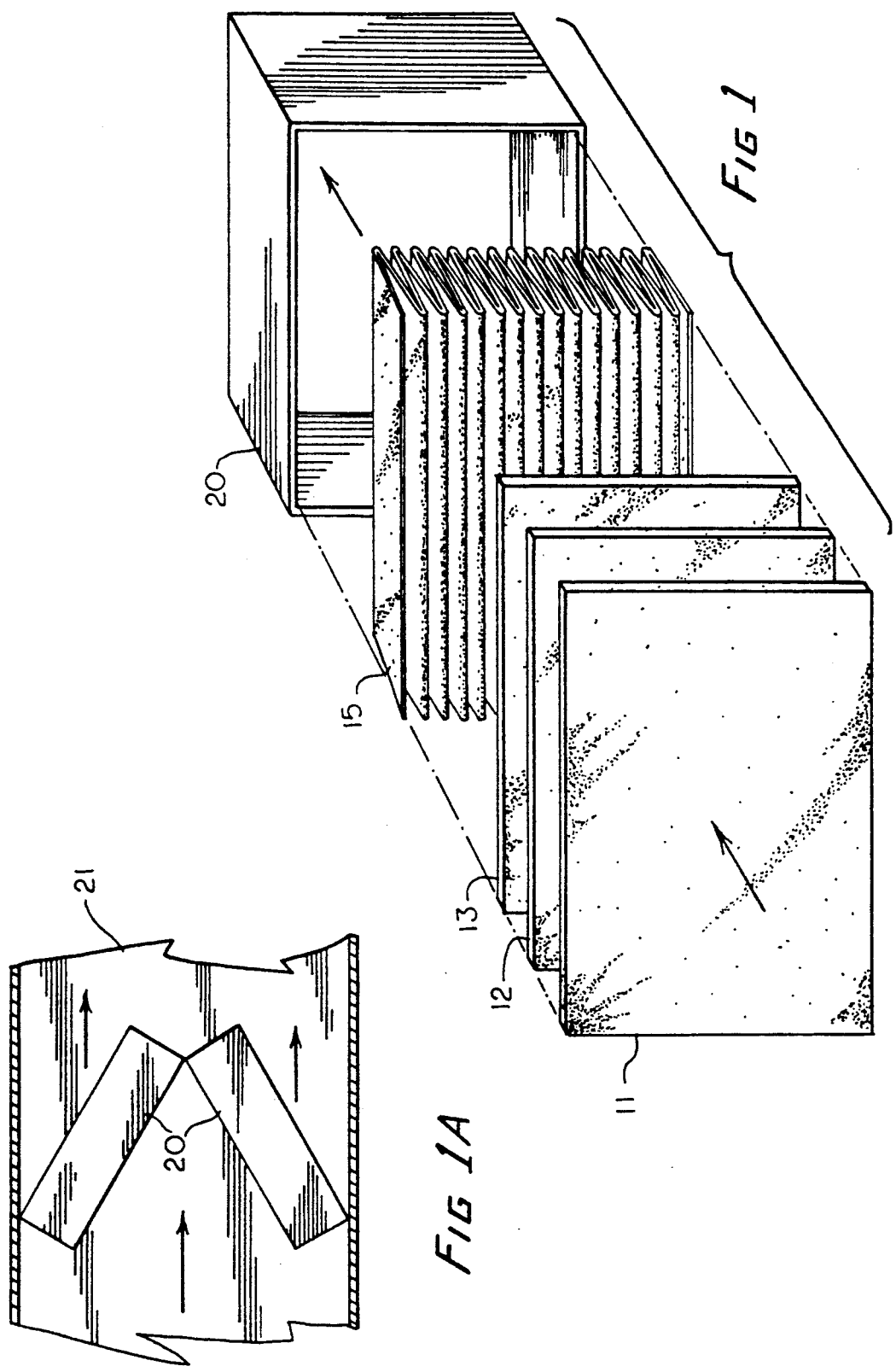
FIG. 1 is an exploded view, in perspective, of an antimicrobial air filter incorporating principles of the invention in a preferred form.
Figure 2:
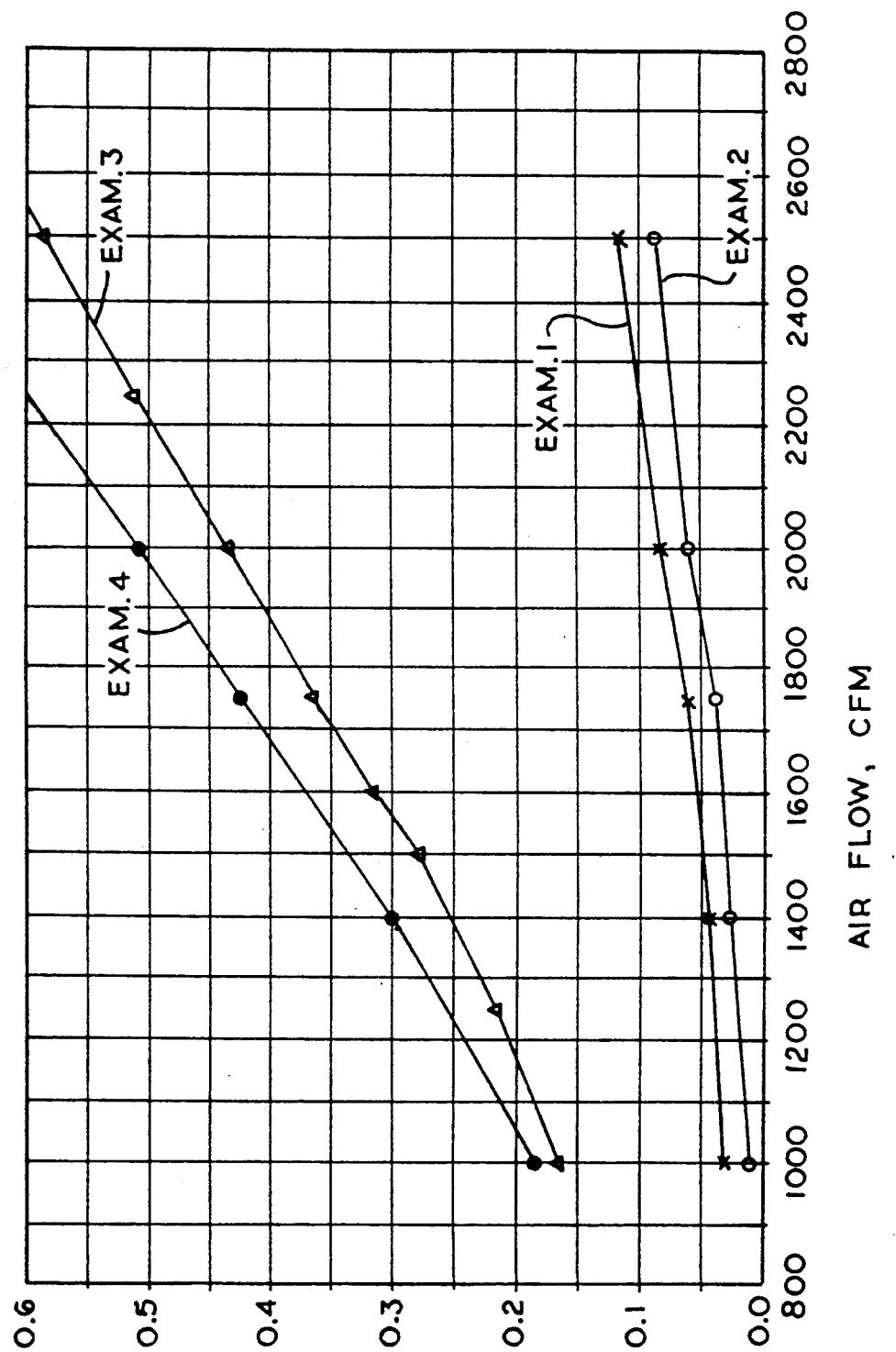
FIG. 2 is a graph of pressure drop curves for the filters of examples 1-4 with air pressure drop in inches, water gauge, plotted against air flow in cubic feet per minute.

The treated foam was mounted flush against a layer 12 of the same foam material of the same size but not treated with the biostat and instead having 45 pores per inch. It in turn was mounted flush against a conventional 24 inch by 30 inch by ¼" sheet 13 of non-woven polyester fabric impregnated with activated carbon such as the activated carbon sold by Columbus Industries of Ashville, Ohio under the trademark Polysorb. The combination was mounted in a frame 20 together with a second of the same construction in a V formation in an air duct 21 as shown in FIG. 1A. The pressure drop curve for the filter is shown in FIG. 2. Particulate arresting efficiency of the 20 pores per inch layer was measured at 69% average arrestance. The efficiency of the 45 pores per inch layer was measured at 52% average arrestance. The efficiency of the carbon impregnated fabric was found to be 80% average arrestance. The actual carbon was found to remain free of any evidence of migration thereto by the Intersept after sustained filter operation.

EXAMPLE 2

The same thermally reticulated polyester foam filter media with 20 pores per inch as that used in Example 1, and the same activated carbon impregnated fabric as that used in Example 1, were framed without the layer 12 of untreated foam but rather with a small air gap therebetween maintained by metal screening. The pressure drop curve for this filter is also shown in FIG. 2. Again, the activated carbon was found to remain free of the Intersept after filter operation.

EXAMPLE 3

HEPA media 15 of the type previously described, measuring 24 inches by 30 inches by ¼ inch thick, was spray treated with Intersept as in Example 1 after it had emerged from a curing oven in a congealed, paper-like state, but still damp. It was then also embossed with dimples measuring approximately 4 inches in length by ¼ inch wide and 1/16 inch deep at a density of 12 dimples per square foot. The dimples function to render the media separatorless, i.e, not requiring metallic separators or spacers to maintain adjacent pleats apart at one end. Once pleated, adjacent dimples abut one another so as to cause the pleats to stand off well from each other.

The material was next passed through a second curing oven from which it merged thoroughly dry. It was then pleated and framed to have 80 24-inch long pleats with each pleat having two 4-inch long folds. Though this filter clearly performed extremely well, it would not usually be practical without being associated with a prefilter to filter particulates larger than 10 microns over a substantial time period. Such an association is presented in Example 4.

The filter was mounted in the air duct test system described in Example 1. Its pressure drop curve is also shown in FIG. 2. Its efficiency was measured at 99% at 0.5 microns for Mil. Std. 282 Test Method. Though the edges of the HEPA pleats abutted the carbon impregnated fabric, migration of the Intersept into the carbon was found to be negligible.

EXAMPLE 4

The HEPA filter media of Example 3 untreated with Intersept was mounted to the filter media of Example 1 with the edges of the HEPA pleats in abutment with the fabric with activated carbon. In this manner the media of Example 1 functioned as a prefilter for the HEPA filter. The curve of pressure drop for this combination is also shown in FIG. 2. Its efficiency was also measured at 99% at 0.5 microns for Mil. Std. 282 Test Method.

From the foregoing examples it is seen that antimicrobial air filters are now provided that are capable of being used in conventional central heating and air conditioning systems that are effective in ridding air of microorganisms yet without the need for stronger air circulation means. The filters may incorporate activated carbon for deodorization without the carbon becoming deactivated by migration of the antimicrobial agent.

It should be understood that although only four specific examples have been described in detail, many modifications, additions and deletions, other than those expressly suggested, may be made without departure from the spirit and scope of the invention as disclosed in the following claims.

I claim:

1. An antimicrobial air filter comprising a layer of fabric bearing porous activated carbon particulate deodorizing agents and a layer of polymeric expanded foam filter media impregnated with a biostat type antimicrobial agent, said fabric layer being separated from said foam layer such that said antimicrobial agent is substantially prevented from contacting said porous activated carbon particulate deodorizing agents and clogging the carbon pores.

2. The air filter of claim 1 wherein said fabric layer is comprised of a non-woven material.

3. The air filter of claim 2 wherein said fabric layer is comprised of a non-woven polyester material.

4. The air filter media of claim 1 wherein said fabric layer and said foam layer are spatially separated.

5. The air filter media of claim 1 further comprising a sublayer of polymeric expanded foam filter media untreated with an antimicrobial agent mounted between said fabric layer and said layer of polymeric expanded foam filter media.

6. The air filter of claim 1 wherein said foam filter media is thermally reticulated polyester foam.

7. The air filter of claim 1 wherein said foam filter media is thermally reticulated polyurethane foam.

8. The air filter of claim 1 further comprising a layer of HEPA filter media located adjacent said layer of fabric.

9. The air filter of claim 8 wherein said HEPA filter media is treated with a biostat type antimicrobial agent.

10. The air filter of claim 9 wherein said HEPA filter is pleated with pleat edges in abutment with said layer of fabric.

11. An antimicrobial air filter comprising a pleated sheet of HEPA filtration material comprising glass fibers treated with a biostat type antimicrobial agent and a layer of fabric bearing porous activated carbon particulate deodorizing agents mounted adjacent said pleated sheet.

12. The air filter of claim 11 wherein said HEPA filtration material is dimpled.

13. The air filter of claim 11 wherein said layer of fabric abuts said pleated sheet.

14. The air filter of claim 11 further comprising a layer of polymeric expanded foam filter media mounted adjacent said sheet.

15. The air filter of claim 14 wherein said layer of foam filter media is treated with a biostat type antimicrobial agent.

16. An antimicrobial air filter comprising a layer of fabric bearing porous activated carbon particulate deodorizing agents, a layer of polymeric expanded foam filter media impregnated with a biostat type antimicrobial agent, and a layer of HEPA filter media located adjacent said layer of fabric, said fabric layer being separated from said foam layer such that said antimicrobial agent is substantially prevented from contacting said porous activated carbon particulate deodorizing agents and clogging the carbon pores.

17. The air filter of claim 16 wherein said HEPA filter media is treated with a biostate type antimicrobial agent.

18. The air filter of claim 17 wherein said HEPA filter is pleated with pleat edges in abutment with said layer of fabric.

* * * * *